INVENTOR.
M. E. REINECKE
BY *Hudson & Young*
ATTORNEYS

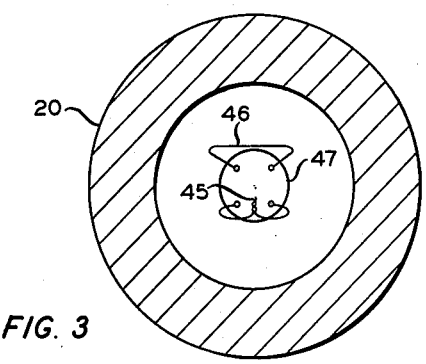
FIG. 3
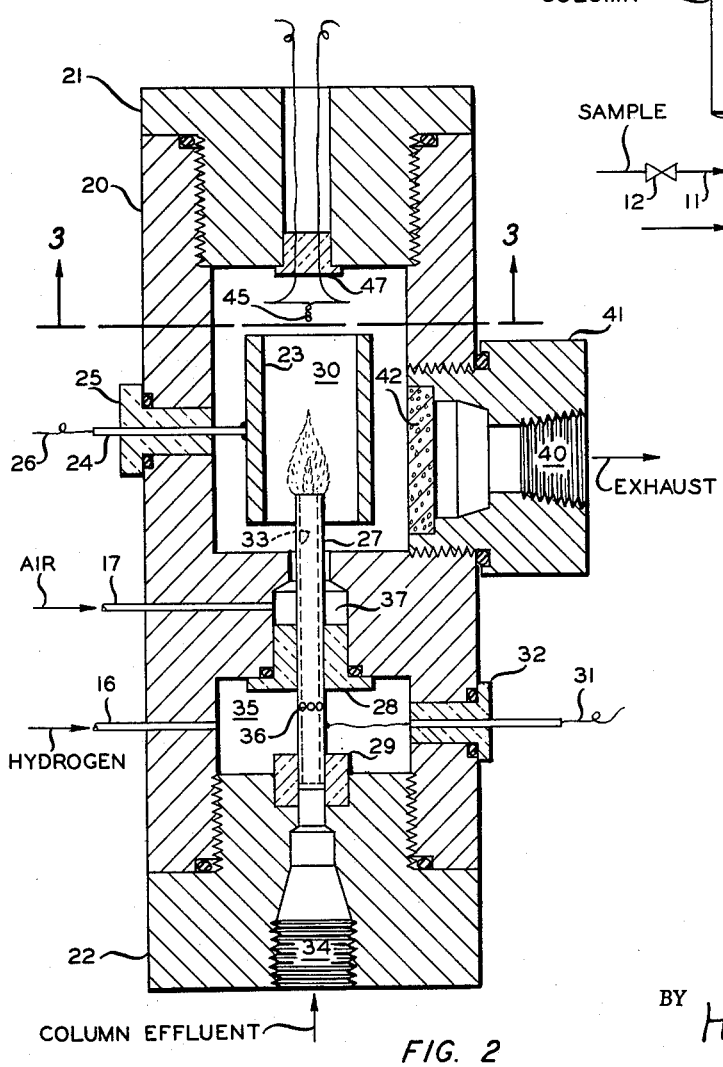
FIG. 1
FIG. 2
INVENTOR.
M. E. REINECKE
BY Hudson & Young
ATTORNEYS April 23, 1963 M. E. REINECKE 3,086,848
GAS ANALYZER
Filed May 23, 1960 2 Sheets-Sheet 2

United States Patent Office 3,086,848
Patented Apr. 23, 1963

3,086,848
GAS ANALYZER
Marvin E. Reinecke, Bartlesville, Okla., assignor to Phillips Petroleum Company, a corporation of Delaware
Filed May 23, 1960, Ser. No. 31,045
1 Claim. (Cl. 23—254)

This invention relates to the analysis of fluid streams which contain combustible constituents.

In various types of analytical procedures, there is a need for apparatus which is capable of detecting combustible constituents of fluid streams. One example of such a need occurs in the field of chromatography. Chromatographic analyzers have recently been developed which provide accurate analyses of hydrocarbon mixtures, for example. The fluid mixture to be analyzed is introduced into a column which contains a material that selectively retards passage therethrough of the individual constituents of the fluid mixture. These constituents are then eluted from the colum in sequence by directing a carrier gas through the column and/or by the application of heat to the column. A physical property of the column effluent is measured which is representative of the individual constituents of the fluid mixture. This measurement is generally made by comparing the thermal conductivity of the column effluent with the thermal conductivity of the carrier gas introduced into the column. While such measurements provide accurate analyses of fluid streams, they do not afford the sensitivity which is desired for certain trace analyses.

In accordance with the present invention, there is provided an improved analyzer which is capable of detecting combustible constituents of fluid mixtures. A burner is supplied with a stream of hydrogen and a free oxygen containing gas, such as air. First and second electrodes are positioned adjacent the flame of the burner, and a potential difference is applied between the electrodes. The fluid stream to be analyzed is introduced into the flame so that any combustible constituents therein are burned. Any electrical conduction between the spaced electrodes is measured by a suitable indicating circuit. When hydrogen alone is burned, the electrical conduction between the two electrodes is substantially zero. However, combustible gases such as hydrocarbons produce ions in the flame which conduct electricity between the spaced electrodes. The measurement of the current between the electrodes thus provides an indication of the presence of combustible constituents in the fluid stream to be analyzed.

Accordingly, it is an object of this invention to provide an improved method for detecting the presence of combustible constituents of fluid mixtures.

Another object is to provide improved detecting means for use with chromatographic analyzers.

A further object is to provide apparatus for analyzing combustible fluid streams.

Other objects, advantages and features of this invention should become apparent from the following detailed description, taken in conjunction with the accompanying drawing in which:

FIGURE 1 is a schematic representation of a chromatographic analyzer having the detector of this invention incorporated therein.

FIGURE 2 is a view, shown partially in section, of a preferred embodiment of the burner which is employed in the detector of this invention.

FIGURE 3 is a view taken along line 3—3 in FIGURE 2.

Figure 4:
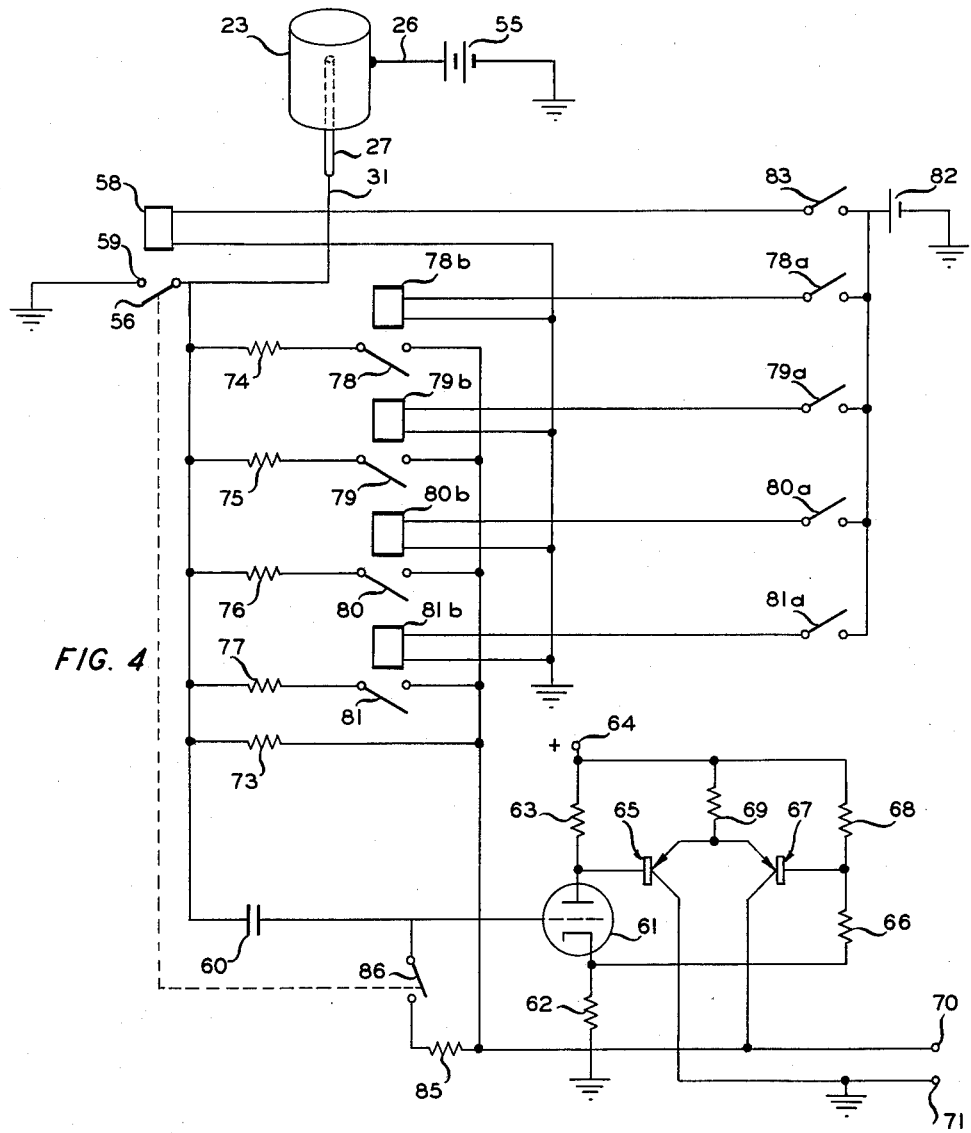
FIGURE 4 is a schematic circuit drawing of the first embodiment of the detecting circuit associated with the burner of FIGURE 2.

Referring now to the drawing in detail and to FIGURE 1 in particular, there is shown a conventional chromatographic column 10 which is filled with a packing material that selectively retards passage therethrough of the constituents of a fluid mixture to be analyzed. Such a fluid mixture is directed into column 10 through a conduit 11 which has a control valve 12 therein. A carrier gas is introduced into column 10 through a conduit 13. The effluent from column 10 is directed to the inlet of a detector 14 by means of a conduit 15. Hydrogen and air are introduced into detector 14 through respective conduits 16 and 17. Detector 14 is provided with a vent conduit 18.

A predetermined volume of the fluid sample to be analyzed is introduced into column 10 by opening valve 12 for a short period of time. The constituents of the fluid mixture are then eluted sequentially from the column by passing carrier gas therethrough. If desired, this elution can be expedited by the application of heat to the column. The individual constituents of the fluid mixture appear in succession in the column effluent and are analyzed by detector 14.

A preferred embodiment of the burner of detector 14 is illustrated in FIGURE 2. The two ends of a housing 20 are closed by respective caps 21 and 22. A hollow cylindrical electrode 23 is positioned within housing 20 and spaced from the wall thereof. Electrode 23 is mounted within housing 20 by a plurality of support rods 24, one of which is shown, that extend through respective electrically insulating plugs 25. An electrical lead 26 is connected to one of the support rods 24. A hollow metal tube 27 is mounted centrally within housing 20 by means of electrically insulating plugs 28 and 29. Tube 27 extends into the combustion chamber 30 defined by electrode 23. An electrical lead 31 extends through an insulating plug 32 in housing 20 to engage tube 27. Tube 27 and cylinder 23 thus form two spaced electrodes in the detecting apparatus.

A second hollow tube 33 is positioned within and spaced from tube 27. Cap 22 is provided with an opening 34 into which the effluent from column 10 is introduced. Opening 34 communicates with tube 33 to direct the column effluent into combustion chamber 30. A stream of hydrogen is introduced into a chamber 35 within housing 20 through conduit 16. Tube 27 is provided with a plurality of openings 36 adjacent chamber 35 so that hydrogen is introduced into tube 27 to be delivered to combustion chamber 30. Combustion supporting air is introduced into chamber 30 through conduit 17 which communicates with a chamber 37 that is in open communication with combustion chamber 30. The combustion products are exhausted from housing 20 through an opening 40 which is formed in a plug 41 in the side of housing 20. A disk 42 of porous material is positioned within the exhaust opening.

Figure 5:
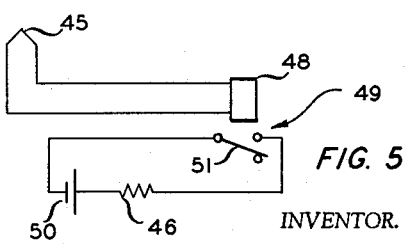
FIGURE 5 is a schematic circuit drawing of additional circuit elements associated with the burner of FIGURE 2.

With reference to FIGURES 2 and 3, a thermocouple 45 and a resistance wire 46 are supported above combustion chamber 30 by an insulating plug 47. As illustrated in FIGURE 5, thermocouple 45 actuates the coil 48 of a relay 49. Resistance wire 46 is connected in circuit with a current source 50 when a switch 51 is closed. Switch 51 is actuated by relay coil 48 so as to be closed in the absence of a signal being supplied from thermocouple 45.

In operation, hydrogen and air are introduced into combustion chamber 30 through respective conduits 16 and 17. Switch 51 is closed at this time so that current is supplied to resistance wire 46. Wire 46 becomes heated to initiate combustion of the hydrogen within chamber 30. Thermocouple 45 is then heated by the resulting flame to open switch 51. Thereafter, the sample mixture to be analyzed is introduced into column 10 and the individual constituents of the sample are eluted from the column in sequence. The column effluent is introduced into chamber 30 so that the combustible constituents of the fluid mixture are burned in chamber 30 in addition to the hydrogen fuel which is supplied through conduit 16.

A first embodiment of the associated electrical measuring circuit is illustrated in FIGURE 4. Cylinder 23 is connected by lead 26 to the positive terminal of a voltage source 55, the negative terminal of which is connected to ground. Tube 27 is connected by lead 31 to a switch 56 and through a capacitor 60 to the control grid of an electrometer tube 61. Switch 56 engages a grounded terminal 59 when a relay coil 58 is energized. The cathode of tube 61 is connected to ground through a resistor 62, and the anode of tube 61 is connected through a resistor 63 to a terminal 64 which is maintained at a positive potential. The anode of tube 61 is also connected to the base of a transistor 65. The cathode of tube 61 is connected through a resistor 66 to the base of a second transistor 67. A resistor 68 is connected between the base of transistor 67 and potential terminal 64. The emitters of transistors 65 and 67 are connected to one another and to terminal 64 through a resistor 69. The collectors of transistors 67 and 65 are connected to respective output terminals 70 and 71, the latter being grounded.

A resistor 73 is connected between lead 31 and output terminal 70. First terminals of resistors 74, 75, 76 and 77 are connected to lead 31. The second terminals of these resistors are connected to output terminal 70 through respective switches 78, 79, 80 and 81. Switches 78, 79, 80 and 81 are closed selectively by closing respective switches 78a, 79a, 80a and 81a which connect respective relay coils 78b, 79b, 80b and 81b in circuit with a current source 82. Resistors 74, 75, 76 and 77 have different values and are inserted selectively to vary the output impedance of the measuring circuit. This provides a sensitivity range for the instrument. Switches 78, 79, 80 and 81 are operated remotely by means of the associated relays in order that the detecting circuit can be constructed in a minimum amount of space and so that the connecting leads are as short as possible. This is important in the high gain detecting circuit.

A switch 86 and a resistor 85 are connected in series between the control grid of tube 61 and output terminal 70. This switch is closed when relay coil 58 is energized. Relay coil 58 is connected in circuit with current source 82 through a switch 83. Closure of switch 83 thus energizes relay coil 58 to ground the output of the detector. This permits the zero point of the amplifying circuit to be measured.

At the beginning of the analysis cycle, hydrogen alone is burned in combustion chamber 30 and electrical conduction between electrodes 23 and 27 is a minimum. When hydrocarbon constituents, for example, appear in the column effluent, the electrical conduction between electrodes 23 and 27 is increased substantially by the ions which are formed in the combustion chamber by the burning of these constituents. This conduction results in an increase in the voltage drop across resistor 73 and any other resistor connected in parallel therewith. The voltage drop is measured by electrometer tube 61 and the output transistor amplifier circuit associated therewith. An increase in conduction between electrodes 23 and 27 thus provides an output signal which is representative of the presence of combustible constituents in the column effluent.

Figure 6:
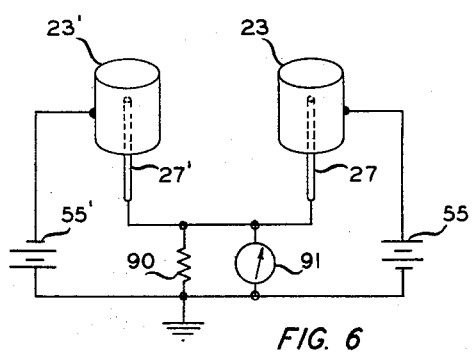
FIGURE 6 is a schematic representation of a second embodiment of the detector circuit.

A second embodiment of the flame detector of this invention is illustrated schematically in FIGURE 6. The circuit of FIGURE 6 employs two separate flame detectors which can be of the configuration shown in FIGURE 2. The detector formed by electrodes 23 and 27 receives the column effluent in the manner previously described. The second detector is formed by electrodes 23′ and 27′. This detector can be of the form shown in FIGURE 2 except that there is no column effluent introduced through tube 33. Hydrogen alone is burned in combustion chamber 30. The positive terminal of a voltage source 55 is connected to electrode 23, whereas the negative terminal of a voltage source 55′ is connected to electrode 23′. Electrodes 27 and 27′ are connected to one another and to the first terminal of an impedance element 90. The negative terminal of voltage source 55 and the positive terminal of voltage source 55′ are connected to the second terminal of impedance element 90. A detector 91, which can be an electrometer tube and associated circuit of the form shown in FIGURE 4, is connected across impedance 90. When hydrogen alone is burned in both detectors, electrical conductions between the spaced electrodes of the two detectors are substantially equal and of opposite directions. This results in a zero potential difference being established across impedance 90. However, the presence of a combustible gas in the flame between electrodes 23 and 27 increases conduction therebetween so that the circuit is unbalanced to establish a potential difference across impedance 90. This potential difference is measured by detector 91.

In one specific embodiment of this invention, tube 27 was spaced from cylinder 23 about ⅛ inch. However, larger spacings can be employed without appreciable loss of sensitivity. Electrode spacings much less than ⅛ inch are generally not desirable because the cylinder may become sufficiently heated to emit electrons. This produces noise in the detecting circuit. In this regard, metals having low work functions should be employed in fabricating the electrodes. Potential differences across the electrodes of the order of 300 to 1000 volts have been found to be effective. The apparatus is operable with even lower voltages, but the output generally is not linear. The amount of air introduced into the burner is generally greater than that required to burn the combustible constituents and hydrogen in order to purge the water vapor which is formed.

While the invention has been described in conjunction with chromatographic analyzers, it is to be understood that it is not limited thereto. For example, vapors liberated from drilling mud or soil samples can be analyzed to detect the presence of hydrocarbons therein. Any fluid stream can thus be analyzed to detect combustible constituents. While the invention has been described in conjunction with present preferred embodiments, it is evident that it is not limited thereto.

I claim:

An apparatus for detecting combustible constituents of a fluid mixture which comprises housing means forming a combustion chamber, a first annular electrode positioned within said combustion chamber and spaced apart from said housing means, support means to maintain said electrode in said combustion chamber, means to supply a current of electricity to said electrode from a source external said housing means, a second annular electrode positioned in said housing means and extending from within the area defined by said first electrode to a lower end of said housing means, means to supply electricity to said second electrode, means to supply a potential difference between said first and second electrodes, conduit means provided within said second electrode and in spatial relation thereto adapted to allow introduction and combustion of the material to be analyzed into said combustion chamber, means communicating with said conduit to introduce hydrogen to same, means to introduce free oxygen-containing gas to the combustion zone, means to exhaust said combustion chamber, ignition means within said combustion chamber and adjacent the first electrode so adapted as to ignite hydrogen and material to be analyzed introduced to the combustion chamber, temperature sensing means positioned within said combustion chamber and adjacent said first electrode, said means to ignite and temperature sensing means supported by said housing means above said means to exhaust, means responsive to said temperature sensing means to actuate said ignition means, a source of potential, means connecting said source of potential between said first and second electrodes and means to measure the current between said electrodes.

References Cited in the file of this patent

UNITED STATES PATENTS

| | | |
|---|---|---|
| 2,476,118 | Short | July 12, 1949 |
| 2,511,177 | Richardson | June 13, 1950 |
| 2,991,158 | Harley | July 4, 1961 |

OTHER REFERENCES

Condon: "Anal. Chem.," 31, 1717–1722 (1959).
McWilliam et al.: "Nature," 181, 760 (1958).
Harley: "Nature," 181, 177, 178 (1958).
Scott: "Manufacturing Chemist," 29, 411–416 (1958).
Thompson: "J. Chromatog.," 2, 148–154 (1959).